United States Patent [19]
Roos et al.

[11] 3,803,060
[45] Apr. 9, 1974

[54] BLOWING AGENT ADDITIVE

[75] Inventors: Ernst Roos; Theo Kempermann, both of Cologne; Manfred Abele, Porz-Wahn; Gunter Dammann, Cologne, all of Germany

[73] Assignee: Bayer AG, Leverkusen, Germany

[22] Filed: Jan. 17, 1972

[21] Appl. No.: 218,239

[30] Foreign Application Priority Data
Jan. 18, 1971 Germany.......................... 21021772

[52] U.S. Cl....... 260/2.5 AE, 260/2.5 R, 260/2.5 H, 260/2.5 E, 260/2.5 HA, 260/2.5 HB, 260/18 TN, 260/23 XA, 260/2.5 P, 260/23.7 M, 260/31.8 M, 260/31.8 HR, 260/31.8 PQ, 260/31.8 R, 260/28.5 AV, 260/41 R, 260/41.5 R, 260/45.75 K, 260/45.75 R, 260/724, 260/829, 260/859 PV, 260/894, 260/899, 260/54

[51] Int. Cl... C08f 47/10, C08c 17/10, C08g 22/44
[58] Field of Search........ 260/2.5 R, 513.7, 2.5 HA, 260/2.5 HB, 2.5 H, 2.5 AE, 724

[56] References Cited
OTHER PUBLICATIONS
Blowing Agents; Henry R. Lasman; "Encyclopedia of Polymer Science and Technology" page 548.

*Primary Examiner*—Wilbert J. Briggs, Sr.
*Attorney, Agent, or Firm*—Connolly and Hutz

[57] ABSTRACT

Aromatic sulphinic acids and their salts are used as activators for lowering the decomposition temperature of azodicarbonamide, which have a higher activity than the conventional auxiliary blowing agents. Moreover, no premature liberation of gas takes place.

20 Claims, 1 Drawing Figure

BLOWING AGENT ADDITIVE

This invention relates to aromatic sulphinic acids and their salts as activators for lowering the decomposition temperature of azodicarbonamide which is used as chemical blowing agent for the production of cellular or porous articles based on natural or synthetic rubber and plastics. (See Angewandte Chemie 64 [1952] pages 65–76).

The choice of a suitable chemical blowing agent for the production of cellular or porous articles based on rubber or plastics is determined primarily by the temperature at which the blowing agent decomposes to liberate gas. Azodicarbonamide has a decomposition temperature in the range of 200°C to 210°C. When it is present in mixtures, gas starts to be evolved at about 160°C (loc.cit., page 70, righthand column). In many cases, however, it is desired for decomposition of azodicarbonamide to take place at lower temperatures than this. Decomposition at a lower temperature would reduce the thermal stresses to which mixtures foamed with azodicarbonamide are subjected and would also enable higher decomposition rates and shorter operating cycles to be achieved.

It is already known that the decomposition temperature of azodicarbonamide is reduced by the addition of one or more so-called auxiliary blowing agents which have a lower decomposition temperature than azodicarbonamide (see German Offenlegungsschrift No. 1,569,535)

The use of these auxiliary blowing agents, however, frequently results in premature decomposition of the blowing agent in the course of production and processing of the mixtures containing them because the auxiliary blowing agents used as activators for azodicarbonamide, for example benzene sulphohydrazide, decompose at relatively low temperatures, e.g. at 80°C (see loc.cit. page 71, lefthand column, last paragraph). Consequently, unwanted decomposition of the auxiliary blowing agent may occur during storage of mixtures which contain such combinations of blowing agents. This is manifested e.g. in the case of rubber mixtures by "premature expansion" and in the case of plastics, e.g. PVC pastes, by gassing.

We now have found that aromatic sulphinic acids and their salts represented by the following general formula wherein M represents hydrogen, a metal cation or a group which contains ammonium nitrogen;

n represents the valency of M; and $R_1$ to $R_5$ represent, independently of each other, hydrogen, straight chain or branched chain alkyl groups with from 1 to 4 carbon atoms, or halogen atoms may be used in the production of cellular or porous natural and synthetic rubber or plastic, i.e., synthetic resin articles carried out in the presence of azodicarbonamide as a blowing agent.

The sulphinic acids and sulphinates used according to the invention surprisingly function as activators in lowering the decomposition temperature of azodicarbonamide used as blowing agent and in this respect they have a higher activity than the conventional auxiliary blowing agents such as benzene sulphohydrazide. Moreover, they do not give rise to premature liberation of gas since they are not themselves blowing agents.

The following are mentioned as examples of radicals $R_1$ to $R_5$: Straight chain or branched chain alkyl groups having from 1 to 4 carbon atoms, such as methyl, ethyl, n-propyl, isopropyl, n-butyl, sec.-butyl, tert.-butyl or isobutyl; the halogen atoms may be chlorine, fluorine or bromine.

Suitable metal cations M are especially elements of the first Main Group and the second Main Group and sub-Group and fourth sub-Group of the Periodic System as well as heavy metals. The following are mentioned as specific examples of suitable metal cations: Lithium, sodium, potassium, magnesium, calcium, barium, zinc, cadmium, mercury, tin, lead and iron.

Groups with ammonium nitrogen represented by M may, for example, be groups of the following general formula wherein $R_6$, $R_7$ and $R_8$ represent, independently of each other, hydrogen or an aliphatic radical, the radicals $R_6$ and $R_7$ may together with the ammonium nitrogen form part of a 5, 6 or 7-membered ring system which in the case of a 6-membered ring may in addition contain hetero atom such as oxygen, a nitrogen atom optionally substituted by a $C_1$ to $C_4$ alkyl radical or a sulphur atom.

The aliphatic radicals $R_6$ to $R_8$ may be straight chain or branched chain alkyl radicals having 1 to 4 carbon atoms optionally substituted by phenyl or they may be cycloalkyl radicals with from 5 to 7 carbon atoms. The following are mentioned as examples of alkyl and cycloalkyl radicals: Methyl, ethyl, n-propyl, isopropyl, n-butyl, sec.-butyl, isobutyl, tert.-butyl, benzyl, phenylethyl, phenyl-n-propyl, cyclopentyl, cyclohexyl and methylcyclohexyl.

The following are mentioned as specific examples of compounds which may be used according to the invention:

Benzene sulphinic acid;
lithium benzene sulphinate;
sodium benzene sulphinate;
potassium benzene sulphinate;
magnesium-di(benzene sulphinate);
calcium di-(benzene sulphinate);
zinc-di-(benzene sulphinate);
barium di-(benzene sulphinate);
cadmium di-(benzene sulphinate);
lead di-(benzene sulphinate);
ammonium benzene sulphinate;
trimethylammonium benzene sulphinate;
tertiary butyl ammonium benzene sulphinate;
cyclohexyl ammonium benzene sulphinate;
benzyl ammonium benzene sulphinate;
p-toluene sulphinic acid;

lithium p-toluene sulphinate;
sodium p-toluene sulphinate;
potassium p-toluene sulphinate;
magnesium bis-(p-toluene sulphinate);
calcium bis-(p-toluene sulphinate);
barium bis-(p-toluene sulphinate);
zinc bis-(p-toluene sulphinate);
cadmium bis-(p-toluene sulphinate);
lead bis-(p-toluene sulphinate);
ammonium p-toluene sulphinate;
diethylammonium p-toluene sulphinate;
di-sec.-butylammonium p-toluene sulphinate;
cyclohexyl-methylammonium-p-toluene sulphinate;
morpholinium-p-toluene sulphinate;
thiomorpholinium-p-toluene sulphinate;
piperazinium-p-toluene sulphinate;
p-chlorobenzene sulphinic acid;
lithium-p-chlorobenzene sulphinate;
sodium p-chlorobenzene sulphinate;
potassium p-chlorobenzene sulphinate;
magnesium bis-(p-chlorobenzene sulphinate);
calcium bis-(p-chlorobenzene sulphinate);
barium bis-(p-chlorobenzene sulphinate);
zinc bis-(p-chlorobenzene sulphinate);
cadmium bis-(p-chlorobenzene sulphinate);
lead bis-(p-chlorobenzene sulphinate);
ammonium p-chlorobenzene sulphinate;
triethylammonium p-chlorobenzene sulphinate;
dicyclohexylammonium p-chlorobenzene sulphinate;

pyrrolidinium-p-chlorobenzene sulphinate;
piperidinium-p-chlorobenzene sulphinate;
2,4-dimethylbenzene sulphinic acid;
lithium 2,4-dimethylbenzene sulphinate;
sodium 2,4-dimethylbenzene sulphinate;
potassium 2,4-dimethylbenzene sulphinate;
magnesium-bis-(2,4-dimethylbenzene sulphinate);
calcium-bis-(2,4-dimethylbenzene sulphinate);
barium bis-(2,4-dimethylbenzene sulphinate);
zinc-bis-(2,4-dimethylbenzene sulphinate);
cadmium-bis-(2,4-dimethylbenzene sulphinate);
lead-bis-(2,4-dimethylbenzene sulphinate);
ammonium 2,4-dimethylbenzene sulphinate;
2,5-dimethylbenzene sulphinic acid;
sodium 2,5-dimethylbenzene sulphinate;
zinc bis-(2,5-dimethylbenzene sulphinate);
3,4-dimethylbenzene sulphinic acid;
sodium 3,4-dimethylbenzene sulphinate;
zinc bis-(3,4-dimethylbenzene sulphinate);
2-chloro-4-methyl-benzene sulphinic acid;
sodium 2-chloro-4-methyl-benzene sulphinate;
zinc bis-(2-chloro-4-methyl-benzene sulphinate);
2-methyl-4-chloro-benzene sulphinic acid,
sodium 2-methyl-4-chloro-benzene sulphinate;
zinc bis-(2-methyl-4-chloro-benzene sulphinate);
p-fluorobenzene sulphinic acid;
sodium p-fluorobenzene sulphinate;
zinc bis-(p-fluorobenzene sulphinate);
p-bromobenzene sulphinic acid;
sodium p-bromobenzene sulphinate;
zinc-bis-(p-bromobenzene sulphinate);
p-tertiary butyl-benzene sulphinic acid;
sodium p-tertiary-butyl-benzene sulphinate;
zinc bis-(2,3,4,5,6-pentamethyl-benzene sulphinate); and
zinc bis-(2,3,4,5,6-pentachloro-benzene sulphinate).

Suitable rubbers and plastics for the production of cellular or porous articles using azodicarbonamide and activators based on sulphinic acids or sulphinates are e.g. natural rubber or synthetic, rubber-like polymers obtained e.g. from conjugated diolefines such as butadiene, chlorobutadiene, dimethylbutadiene, isoprene and its homologues; or copolymers of such conjugated diolefines with polymerisable vinyl compounds such as styrene, α-methyl styrene, acrylonitrile, methacrylonitrile, acrylates or methacrylates; polymers such as polyethylene, polypropylene, polyvinyl chloride, polyvinyl acetate, polyvinyl chloride acetate, polystyrene, polyacrylonitrile, acrylonitrile-butadiene-styrene, copolymers, ethylene-vinyl acetate copolymers, ethylene-propylene terpolymers, for example with dienes as tercomponent, ethylene-propylene copolymers, vinyl chloride-ethylene copolymers, vinyl chloride-propylene copolymers, polyurethanes and mixtures of the above mentioned polymers.

The activators to be used according to the invention may be mixed with the foaming mixture in the usual manner, for example on mixing rollers at temperatures from 120°–150°C by mixing for 5–30 minutes, in internal mixers at room temperature by mixing for 5–30 minutes or in mixing vessels equipped with stirrers at room temperature by mixing for 5–120 minutes. The activators may be added at the same time as the other constituents of the mixture but are preferably added at the start, that is from when azodicarbonamide is first used as blowing agent. The quantity of activators used according to the invention should be in the range of from about 0.5 to 30 percent by weight, preferably 2 to 10 percent by weight, based on the blowing agent, in the case of mixtures based on natural or synthetic rubber. In cases where synthetic resins are used, e.g. polyethylene, polypropylene, polyvinyl chloride or polystyrene, the quantity of activators used according to the invention should by in the range of from about 0.1 to 5 parts by weight, preferably 0.5 to 3.0 parts by weight, based on 1 part by weight of the blowing agent.

After addition to natural and/or synthetic rubber the mixtures thus obtained are heated at the usual vulcanization temperatures from 130° to 300°C.

After addition to plastics the expansion according to the invention takes place after heating at temperatures from 160° to 220°C. If necessary the crude material can be expanded again at temperatures from 90° to 120°C.

When using a pressureless process films and pastes pass through a gelatinizing channel heated to 120°–250°C for a period of 0.5–10 minutes.

The mixtures which are to be treated may also contain conventional auxiliary agents, e.g. active or inactive fillers such as carbon black or chalk, antioxidants, antiozonants, stabilizers such as salts of lead, cadmium, calcium, zinc, tin or barium, waxes, dyes, pigments, zinc oxide, fatty acids such as stearic acid, mineral oils, plasticizers such as dioctyl phthalate, butyl nonyl phthalate, butyl benzyl phthalate, dibutyl phthalate, dibutyl adipate or tricresyl phosphate, lubricants, peroxides, vulcanizing agents such as sulphur and accelerators. The following are examples of suitable accelerators: Thiazoles, guanidines, dithiocarbamates, thiurams and 2-mercaptoimidazoline.

The method of preparing the aromatic sulphinic acids and their salts (I) is already known.

The alkali metal salts may be prepared e.g. by reacting aromatic sulphonic acid chlorides with an alkali metal sulphite in aqueous alkaline solution, for example in accordance with the following reaction equation:

Aromatic sulphinates which are only sparingly soluble in water can easily be obtained by double decomposition of the above mentioned alkali metal sulphinates in aqueous solution with those metal salts which form such sparingly soluble aromatic sulphinates, e.g. according to the following equation:

The alkali metal salts may also advantageously be used for the preparation of free aromatic sulphinic acid, e.g. according to the following equation:

Ammonium sulphinates are obtained by reacting the free sulphinic acids with ammonia in accordance with the following equation:

Substituted ammonium sulphinates are obtained by reacting the free sulphinic acids with amines such as the deprotonised compounds of formula (II). The following reaction equation illustrates by way of example the reaction of p-toluenesulphinic acid with morpholine:

The following Examples serve to illustrate the invention. The figures entered in the Tables represent parts by weight unless otherwise indicated.

EXAMPLE 1

Figure 1:
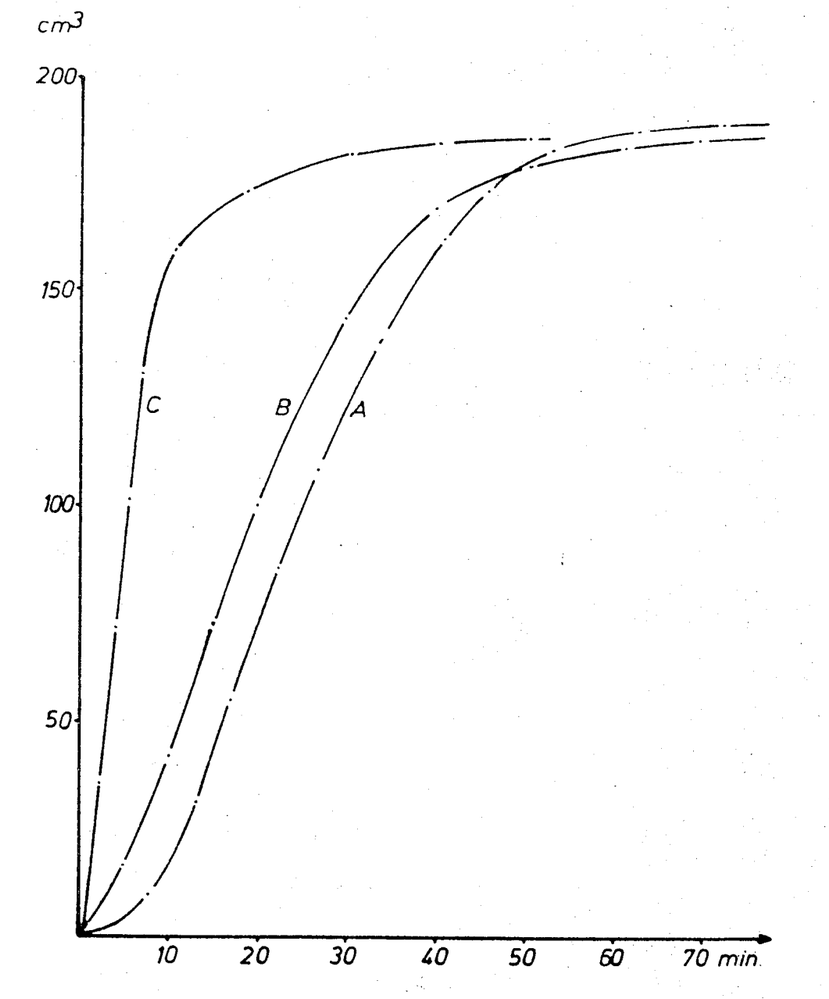

The graphs in FIG. 1 represent the rate of liberation of gas from the azodicarbonamide alone and with the aid of various activators. The rate of liberation of gas was determined on the principle of molecular weight determination by the method of Victor Meyer.

Curve A represents the rate of decomposition of 1 g of pure azodicarbonamide suspended in 1 g of tricresyl phosphate at 192°C.

Curve B represents the rate of decomposition of 1 g of a mixture of 0.9 g of azodicarbonamide and 0.1 g of benzene sulphonhydrazide suspended in 1 g of tricresyl phosphate at 192°C.

Curve C represents the rate of decomposition of 1 g of a mixture of 0.9 g of azodicarbonamide and 0.1 g of zinc dibenzene sulphinate suspended in 1 g of tricresyl phosphate at 192°C.

The curve clearly shows that zinc di-benzene sulphinate accelerates the decomposition of azodicarbonamide for a greater extend than benzene sulphohydrazide.

EXAMPLE 2

The following mixtures were prepared (See Table 1):

TABLE 1

| Mixture No. | 1 | 2 | 3 | 4 | 5 | 6 | 7 | 8 | 9 | 10 | 11 |
|---|---|---|---|---|---|---|---|---|---|---|---|
| Ethylene-propylene-diene terpolymer | 100.0 | 100.0 | 100.0 | 100.0 | 100.0 | 100.0 | 100.0 | 100.0 | 100.0 | 100.0 | 100.0 |
| Zinc oxide | 5.0 | 5.0 | 5.0 | 5.0 | 5.0 | 5.0 | 5.0 | 5.0 | 5.0 | 5.0 | 5.0 |
| Stearic acid | 1.0 | 1.0 | 1.0 | 1.0 | 1.0 | 1.0 | 1.0 | 1.0 | 1.0 | 1.0 | 1.0 |
| fine carbon black | 40.0 | 40.0 | 40.0 | 40.0 | 40.0 | 40.0 | 40.0 | 40.0 | 40.0 | 40.0 | 40.0 |
| powdered chalk | 75.0 | 75.0 | 75.0 | 75.0 | 75.0 | 75.0 | 75.0 | 75.0 | 75.0 | 75.0 | 75.0 |
| naphthenic mineral oil | 75.0 | 75.0 | 75.0 | 75.0 | 75.0 | 75.0 | 75.0 | 75.0 | 75.0 | 75.0 | 75.0 |
| 2-mercaptobenzothiazole | 0.5 | 0.5 | 0.5 | 0.5 | 0.5 | 0.5 | 0.5 | 0.5 | 0.5 | 0.5 | 0.3 |
| tetramethylthiuramic monosulphide | 1.5 | 1.5 | 1.5 | 1.5 | 1.5 | 1.5 | 1.5 | 1.5 | 1.5 | 1.5 | 1.5 |
| N,N'-diphenylthiourea | 1.0 | 1.0 | 1.0 | 1.0 | 1.0 | 1.0 | 1.0 | 1.0 | 1.0 | 1.0 | 1.0 |
| sulphur | 1.5 | 1.5 | 1.5 | 1.5 | 1.5 | 1.5 | 1.5 | 1.5 | 1.5 | 1.5 | 1.5 |
| azodicarbonamide | 3.0 | 3.0 | 3.0 | 3.0 | 3.0 | 3.0 | 3.0 | 3.0 | 3.0 | 3.0 | 3.0 |
| benzene sulphohydrazide (for comparison) | — | 0.45 | — | — | — | — | — | — | — | — | — |
| zinc di-(benzene | — | — | 0.15 | — | — | — | — | — | — | — | — |

TABLE 1.—Continued

| Mixture No. | 1 | 2 | 3 | 4 | 5 | 6 | 7 | 8 | 9 | 10 | 11 |
|---|---|---|---|---|---|---|---|---|---|---|---|
| sulphinate) sodium benzene sulphinate | — | — | — | 0.15 | — | — | — | — | — | — | — |
| zinc bis-p-chlorobenzene sulphinate) | — | — | — | — | 0.15 | — | — | — | — | — | — |
| lead di-(benzene sulphinate) | — | — | — | — | — | 0.15 | — | — | — | — | — |
| cadmium di-(toluene sulphinate) | — | — | — | — | — | — | 0.15 | — | — | — | — |
| cadmium di-(benzene sulphinate) sodium toluene sulphinate | — | — | — | — | — | — | — | — | 0.15 | — | — |
| Magnesium di-(benzene sulphinate) | — | — | — | — | — | — | — | — | — | 0.15 | — |
| sodium p-chlorobenzene sulphinate | — | — | — | — | — | — | — | — | — | — | 0.15 |

The mixtures were prepared on mixing rollers and extruded to form profiles of constant cross-section. These profiles were then placed in a suitable vulcanizing mould. The unvulcanized profiles were cut into equal lengths before being introduced into the moulds and only partly filled the moulds so that complete filling of the moulds during and after vulcanization was possible only after complete liberation of gas from azodicarbonamide. Vulcanization was carried out in a press at 160°C for 20 minutes.

The densities (g/cm³) of the vulcanized and expanded profiles are shown below:

| Mixture No. | 1 | 2 | 3 | 4 | 5 | 6 | 7 | 8 | 9 | 10 | 11 |
|---|---|---|---|---|---|---|---|---|---|---|---|
| Density (g/cm³) | 0.83 | 0.56 | 0.54 | 0.55 | 0.57 | 0.59 | 0.54 | 0.57 | 0.57 | 0.56 | 0.54 |

The figures in this table show that insufficient gas is evolved from azodicarbonamide at 160°C without an activator present and consequently azodicarbonamide does not sufficiently expand the mixture. In that case, a profile with relatively high density is obtained (mixture No. 1.) All the other mixtures (Nos. 2 to 11) which contained activators in addition to azodicarbonamide completely filled the moulds. This is manifested by the low densities. The surprising finding in this experiment is that the sulphinates used show the same activator effect in a quantity of 5 percent (based on azodicarbonamide) as benzene sulphohydrazide in a quantity of 15 percent.

EXAMPLE 3

Mixtures Nos. 12 to 23 represented in Table 2 were prepared.

The components of the mixture were homogenized for 10 minutes on mixing rollers heated to 135°C and then removed in the form of a foil. The resulting foil was then gelatinized in a gelatinizing channel heated with circulating air at 190°C to effect complete gelatinization and foamed at the same time. The time of stay in the curing oven was 2 minutes.

The results obtained with formulations 12 to 23 are summarized in the Table below.

| Mixture No. | 12 | 13 | 14 | 15 | 16 | 17 | 18 | 19 | 20 | 21 | 22 | 23 |
|---|---|---|---|---|---|---|---|---|---|---|---|---|
| Density (g/cm³) | 0.44 | 0.22 | 0.25 | 0.74 | 0.60 | 0.62 | 1.04 | 0.67 | 0.65 | 1.03 | 0.37 | 0.55 |

It is clear that the mixtures containing azodicarbonamide as blowing agent and zinc di-(benzene sulphinate) or zinc di-(4-chloro-benzenesulphinate) as activator result in products with a lower specific weight than the corresponding comparative formulations.

TABLE 2

| Mixture No. | 12 | 13 | 14 | 15 | 16 | 17 | 18 | 19 | 20 | 21 | 22 | 23 |
|---|---|---|---|---|---|---|---|---|---|---|---|---|
| PVC paste for comparison (K value approx. 70) | 55 | 55 | 55 | | | | | | | | | |
| Suspension PVC (K-value approx. 70) | | | | 50 | 50 | 50 | | | | | | |
| Ethylene-vinyl acetate-vinyl chloride terpolymer | | | | | | | 100 | 100 | 100 | 100 | 100 | 100 |
| Alkylsulphonic acid ester of phenol | 45 | 45 | 45 | | | | | | | | | |
| Polyurethane | | | | 50 | 50 | 50 | | | | | | |
| Diisononylphthalate | | | | | | | | | | 20 | 20 | 20 |
| Azodicarbonamide | 2.0 | 2.0 | 2.0 | 2.0 | 2.0 | 2.0 | 2.0 | 2.0 | 2.0 | 2.0 | 2.0 | 2.0 |
| Ba/Cd stabilizer (fl.) | 1.5 | | | | | | | | | | | |
| Dibutyl tin mercaptide | | | | 1.0 | 1.0 | 1.0 | 1.0 | 1.0 | 1.0 | 1.0 | 1.0 | 1.0 |
| Zinc di-(benzenesulphinate) | | 1.5 | | | 1.5 | | | 1.5 | | | 1.5 | |
| Zinc di-(4-chlorobenzene sulphinate) | | | 1.5 | | | 1.5 | | | 1.5 | | | 1.5 |
| Chalk | | | | | | | 5.0 | 5.0 | 5.0 | 5.0 | 5.0 | 5.0 |
| Ester wax, partly saponified | | | | 0.5 | 0.5 | 0.5 | 0.5 | 0.5 | 0.5 | 0.5 | 0.5 | 0.5 |
| 12 hydroxystearic acid | | | | 0.2 | 0.2 | 0.2 | | | | | | |

EXAMPLE 4

Mixtures Nos. 24 to 37 represented in Table 3 were prepared.

The components of the formulation were homogenized on a three roll mill. The resulting paste was introduced into a gas-tight mould where it was heated under pressure at 160°C (and 175°C respectively) for 20 minutes and then cooled under pressure. The resulting product was then removed from the mould and blown up in a hot air atmosphere at 100°C for 30 minutes.

The resulting densities of the end products obtained from formulations 24 to 37 are entered at the end of Table 3.

The results show that mixtures which contain zinc di-(benzenesulphinate) or zinc di-(4-chlorobenzene sulphinate) as activator give rise to products with a lower specific gravity than the corresponding formulations used for comparison both in the case where the blowing agent used in azodicarbonamide and in the case where a mixture of azodicarbonamide and benzene sulphohydrazide in the ratio of 85:15.

TABLE 3

| Mixture No. | 24 | 25 | 26 | 27 | 28 | 29 | 30 | 31 | 32 | 33 | 34 | 35 | 36 | 37 |
|---|---|---|---|---|---|---|---|---|---|---|---|---|---|---|
| Vinyl chloride-vinyl acetate copolymer suitable for preparing a paste | 50 | 50 | 50 | | | | | | | | | | | |
| PVC paste (K-value approx. 70) | | | | 50 | 50 | 50 | 50 | 50 | 50 | 50 | 50 | 50 | 50 | 50 |
| Di-2-ethylhexyl phthalate | 50 | 50 | 50 | 50 | 50 | 50 | 50 | 50 | 50 | 50 | 50 | 50 | 50 | 50 |
| dibutyl tin mercaptide | 1.0 | 1.0 | 1.0 | 1.0 | 1.0 | 1.0 | 1.0 | 1.0 | | | | | | |
| zinc di-(benzenesulphinate | | 1.5 | | | 1.5 | | 0.5 | | | 1.5 | | | 1.5 | |
| zinc di-(4-chlorobenzene sulphinate) | | | 1.5 | | | 1.5 | | 0.5 | | | 1.5 | | | 1.5 |
| dibasic lead phthalate | | | | | | | | | 1.5 | | | 1.5 | | |
| sodium bicarbonate | | | | | | | | | 1.0 | 1.0 | 1.0 | 1.0 | 1.0 | 1.0 |
| azodicarbonamide | | | | 4.75 | 4.75 | 4.75 | 4.5 | 4.5 | 3.0 | 3.0 | 3.0 | | | |
| azodicarbonamide/benzene sulphohydrazide = 85:15 | 5 | 5 | 5 | | | | | | | | | 3.0 | 3.0 | 3.0 |
| Density (g/cm³) at 160°C | 0.41 | 0.12 | 0.11 | 1.18 | 0.21 | 0.19 | 0.25 | 0.25 | | | | | | |
| Density (g/cm³) at 175°C | | | | 0.36 | 0.19 | 0.18 | 0.24 | 0.23 | 0.20 | 0.16 | 0.16 | 0.21 | 0.18 | 0.18 |

EXAMPLE 5

Mixtures Nos. 38 to 51 represented in Table 4 were prepared.

All the components of the formulations were homogenised on a three roll mill.

The pastes thus obtained were applied with a coating knife to a siliconised support fabric and then gelatinized in a gelatinizing channel heated with circulating air and foamed up.

The residence times of the mixtures which were to be foamed and the temperature in the gelatinizing channel were varied.

The results obtained for formulations 38 to 51 are summarised in Tables 5 and 6.

It is clear from the results that when mixtures containing azodicarbonamide are applied in equal amounts (approximately 850 g/m$^2$), those which also contain zinc di-(benzene sulphinate) or zinc di-(4-chlorobenzene sulphinate) result in products with a lower specific gravity than the products which are obtained from the corresponding comparative mixtures. This effect is all the more obvious the shorter the time of stay in the gelatinizing channel.

In addition, it is observed that such mixtures give rise to products with a substantially higher proportion of open pores than those which contain e.g. a dibasic lead phthalate as activator.

The same applies to mixtures which contain as blowing agent a mixture of azodicarbonamide and benzene sulphohydrazide in the proportion of 85:15 instead of azodicarbonamide alone.

Similar results are obtained when the gelatinizing temperature is varied instead of the time of stay.

TABLE 4

| Mixture No. | 38 | 39 | 40 | 41 | 42 | 43 | 44 | 45 | 46 | 47 | 48 | 49 | 50 | 51 |
|---|---|---|---|---|---|---|---|---|---|---|---|---|---|---|
| PVC paste (k-value approximately 70) | 50 | 50 | 50 | 50 | 50 | 50 | 50 | 50 | | | | | | |
| Vinyl chloride-vinylacetate copolymer which can be made up to a paste | | | | | | | | | 50 | 50 | 50 | 50 | 50 | 50 |
| Alkyl sulphonic acid ester of phenol | | | | | | | | | 50 | 50 | 50 | 50 | 50 | 50 |
| Di-(2-ethylhexyl) phthalate | 37.5 | 37.5 | 37.5 | 37.5 | 37.5 | 37.5 | 37.5 | 37.5 | | | | | | |
| Benzyl butyl phthalate | 12.5 | 12.5 | 12.5 | 12.5 | 12.5 | 12.5 | 12.5 | 12.5 | | | | | | |
| Azodicarbonamide | 1.0 | 1.0 | 1.0 | 1.0 | | | | | 1.0 | 1.0 | 1.0 | | | |
| Azodicarbonamide/benzenesulphohydrazide = 85:15 | | | | | 1.0 | 1.0 | 1.0 | 1.0 | | | | 1.0 | 1.0 | 1.0 |
| Dibutyl tin mercaptide | 1.0 | | | | 1.0 | | | | 1.0 | | | 1.0 | | |
| Dibasic lead phthalate | | 1.5 | | | | 1.5 | | | | | | | | |
| Zinc di-(benzene sulphinate) | | | 1.5 | | | | 1.5 | | | 1.5 | | | 1.5 | |
| zinc di-(4-chlorobenzene sulphinate | | | | 1.5 | | | | 1.5 | | | 1.5 | | | 1.5 |

TABLE 5

Density (g/cm$^3$) at time of stay in minutes in gelatinizing channel, temperature 190°C

| Mixture No. | 3.43 | 2.66 | 1.71 | 1.35 | 1 |
|---|---|---|---|---|---|
| 38 | 0.50 | 0.64 | 0.88 | 0.94 | 1.08 |
| 39 | 0.33 | 0.34 | 0.35 | 0.42 | 0.83 |
| 40 | 0.34 | 0.35 | 0.38 | 0.39 | 0.51 |
| 41 | 0.34 | 0.35 | 0.37 | 0.39 | 0.51 |
| 42 | 0.64 | 0.73 | 0.89 | 0.92 | 1.09 |
| 43 | 0.33 | 0.34 | 0.42 | 0.54 | 0.92 |
| 44 | 0.40 | 0.41 | 0.43 | 0.48 | 0.62 |
| 45 | 0.39 | 0.39 | 0.39 | 0.45 | 0.65 |

TABLE 6

| Mixture No. | Density (g/cm³) at time of stay 3.43 minutes in gelatinizing channel in dependence upon the temperature | | |
|---|---|---|---|
| | 140°C | 150°C | 160°C |
| 46 | 1.20 | 1.10 | 0.99 |
| 47 | 0.89 | 0.65 | 0.45 |
| 48 | 0.98 | 0.71 | 0.51 |
| 49 | 1.03 | 0.92 | 0.92 |
| 50 | 0.97 | 0.78 | 0.58 |
| 51 | 0.93 | 0.79 | 0.58 |

EXAMPLE 6

The following mixtures were prepared (see Table 7).

TABLE 7

| Mixture NO | 52 | 53 | 54 | 55 |
|---|---|---|---|---|
| Styrene-butadiene copolymer (styrene content approx. 23.5%) | 70.0 | 70.0 | 70.0 | 70.0 |
| Styrene-butadiene copolymer (styrene content approx. 60%) | 30.0 | 30.0 | 30.0 | 30.0 |
| Coumarone resin | 5.0 | 5.0 | 5.0 | 5.0 |
| Precipitated silicic acid containing a small proportion of calcium silicate | 45.0 | 45.0 | 45.0 | 45.0 |
| Aromatic mineral oil | 2.5 | 2.5 | 2.5 | 2.5 |
| Zinc oxide | 5.0 | 5.0 | 5.0 | 5.0 |
| Stearic acid | 3.0 | 3.0 | 3.0 | 3.0 |
| Ethylene glycol | 1.1 | 1.1 | 1.1 | 1.1 |
| Diphenylamine derivative | 1.0 | 1.0 | 1.0 | 1.0 |
| Sulphur | 2.5 | 2.5 | 2.5 | 2.5 |
| 2-Mercaptobenzothiazole | 1.5 | 1.5 | 1.5 | 1.5 |
| Azodicarbonamide | 3.5 | — | 3.5 | 3.5 |
| Azodicarbonamide/benzenesulpho-hydrazide = 85 : 15 | — | 3.5 | — | — |
| Zinc di-(benzene sulphinate) | — | — | 0.175 | — |
| Zinc bis-(p-chlorobenzene sulphinate) | — | — | — | 0.175 |

The mixtures were prepared on mixing rollers and rolled out into plates about 10 mm in thickness. 420 g of each mixture were then introduced into a mould measuring 200 mm × 200 mm × 8 mm (corresponding to filling the mould by 103 volumes percent) and then pre-cured for 12 minutes at 150°C at a pressure of 80 kg wt/cm² in a steam heated press. The plates were removed from the mould at the end of this time and were found to have undergone substantial expansion. These expanded plates were then placed in a hot air chamber (130°C) for 30 minutes to complete curing.

After cooling, the plates were split in a splitting machine and the samples obtained were tested to determine their density and hardness. The following results were obtained:

| Mixture No. | 52 | 53 | 54 | 55 |
|---|---|---|---|---|
| Density (g/cm³) | 0.69 | 0.48 | 0.41 | 0.45 |
| Hardness (Shore A) | | | | |
| Outer skin | 67 | 54 | 51 | 52 |
| Split surface | 60 | 46 | 42 | 44 |

The results show that the plates produced from azodicarbonamide without activator have undergone only slight expansion whereas the activators used effect distinctly more rapid liberation of gas, which is expressed by the lower densities of the product. It should be noted that the activators used according to the invention (mixtures 54 and 55) produce the same effect at lower doses as benzene sulphohydrazide (mixture 53).

EXAMPLE 7

The following mixture was prepared (Table 8).

TABLE 8

| Mixture No. | 56 |
|---|---|
| Polychloroprene rubber | 100,0 |
| Magnesium oxide | 4,0 |
| Diphenylamine derivative | 1,5 |
| Medium thermal black | 20,0 |
| Alkylsulphonic acid ester of phenol | 30,0 |
| Powdered chalk | 45,0 |
| Stearic acid | 1,0 |
| Zinc oxide | 5,0 |
| N,N'-diphenylthiourea | 1,0 |
| 2-Mercaptoimidazoline | 1,0 |
| Azodicarbonamide | 2,7 |
| Zinc-di-(benzene sulphinate) | 0,3 |

The mixture was prepared on mixing rollers and extruded to form a profil. This profil was then placed in a suitable vulcanizing mould and only partly filled it. Vulcanization was carried out in a steam-heated press at 160°C for 20 minutes.

The vulcanized and expanded profile has a density of 0.52 g/cm³.

EXAMPLE 8

The following mixtures were prepared (Table 9).

TABLE 9

| Mixture No. | 57 | 58 |
|---|---|---|
| Ethylene vinyl acetate copolymer | 100,0 | 100,0 |
| Powdered chalk | 20,0 | 20,0 |
| Clay | 20,0 | 20,0 |
| Stearic acid | 1,0 | 1,0 |
| 1,3-Bis-(tertiary butyl peroxi)-iso-propylbenzene (40%) | 1,0 | 1,0 |
| Azodicarbonamide | 5,0 | 4,5 |
| Zinc-di-(benzene sulphinate) | — | 0,5 |

The mixtures were prepared on mixing rollers. The mixing temperature was about 80°–90°C. The peroxide was added finally at about 70°–80°C. The mixtures were then rolled out into plates about 7 mm in thickness and 330 g of each introduced into a mould measuring 200 mm × 20 mm × 6 mm (corresponding to filling the mould by 100 volumes percent).

In this way two plates per mixture were placed and then heated for 8 minutes, respectively 12 minutes at 160°C at a pressure of 80 kg wt/cm² on the surface of the mouldings.

At the end of the cited time the plates were removed from the mould and were found to have undergone substantial expansion. After cooling, the plates were split in a splitting machine and the samples obtained were tested to determine their density and hardness. The following results were obtained:

| Mixture No. | 57 | 58 |
|---|---|---|
| Heating time for 8 min. at 160°C | | |
| Density (g/cm³) | practically no | 0,21 |
| Hardness (Shore A) | expansion | 33 |
| Heating time for 12 min. at 160°C | | |
| Density (g/cm³) | about 0,9 | 0,19 |
| Hardness (Shore A) | about 80 | 30 |

The results show that the plates produced from azodicarbonamide without activator have undergone only slight, respectively no expansion whereas the activator zinc-di-(benzene sulphinate) used effect distinctly more rapid liberation of gas which is expressed by the lower densities of the product.

EXAMPLE 9

To produce extruded articles made of polyethylene the commercially available granulates are mixed in suitable mixing devices such as internal mixers with 0.3–0.4 percent butyl stearate as an adhesive agent. Mixing time 5–30 minutes, preferably 10 minutes. Thereafter the activator and the azodicarbonamide are added. Any possible stickiness of the granulate can be prevented by 4–5 hour storage at 50° to 70°C.

The processing conditions have been correctly choosen if the extruded or injection-moulded materials leave the extrusion orifize or the nozzle as a bubble-free melt and if the foaming process starts 1–5 cm away from the orifize or if the foaming takes place upon injection moulding 1–5 cm after injecting into the free space.

Temperature program for the extruder:
Feed zone: 130°–150°C
Compression zone: 150°–170°C
Metering zone: 180°–190°C
Injection mould: 130°–155°–180°C starting from the feeding hopper
Nozzle: maximum 220°C
Density of the parts obtained: 0.4–0.5 g/cm³

What we claim is:

1. A process for the production of a cellular or porous article of at least one member of the group consisting of natural rubber, synthetic rubber and synthetic resins wherein the process is carried out in the presence of azodicarbonamide as blowing agent and as an activator for the blowing agent, an activating amount of a compound of the formula:

wherein
M is hydrogen, a metal cation or a group containing an ammonium nitrogen,
n is the valency of M and
$R_1$ to $R_5$ are, independently of each other, hydrogen, alkyl groups having 1 to 4 carbon atoms or halogen.

2. The process of claim 1 in which the metal cation M is an element of the first Main Group, the second Main or sub-Group or the fourth sub-Group of the Periodic System or a heavy metal.

3. The process of claim 1 in which M is a group containing ammonium nitrogen of the formula:

wherein
$R_6$ and $R_7$ are, independently of each other, hydrogen or an aliphatic radical or $R_6$ and $R_7$ together with the ammonium nitrogen form a 5, 6 or 7-membered ring system which in the case of the 6-membered ring may contain an additional hetero atom optionally substituted by an alkyl radical having 1 to 4 carbon atoms or a sulphur atom and $R_8$ is hydrogen or an aliphatic radical.

4. The process of claim 1 wherein the compound of said formula is p-chlorobenzene sulphinic acid.

5. The process of claim 1 wherein the compound of said formula is sodium benzene sulphinate.

6. The process of claim 1 wherein the compound of said formula is zinc di-(benzene sulphinate).

7. The process of claim 1 wherein the compound of said formula is sodium p-chlorobenzene sulphinate.

8. The process of claim 1 wherein the compound of said formula is zinc di-(p-chlorobenzene sulphinate).

9. The process of claim 1 wherein the compound of said formula is zinc di-(p-toluenesulphinate).

10. The process of claim 1 wherein the selected member of said group is a synthetic rubber homopolymer of butadiene, chlorobutadiene, dimethylbutadiene or isoprene or its homologs or a copolymer of said conjugated diolefins with styrene, α-methylstyrene, acrylonitrile, methacrylonitrile, acrylates or methacrylates.

11. The process of claim 1 wherein the selected member of said group is a synthetic resin selected from the group consisting of polyethylene, polypropylene, polyvinyl chloride, polyvinyl acetate, polyvinyl chloride-acetate, polystyrene, polyacrylonitrile, acrylonitrile-butadiene-styrene copolymer, ethylene-vinyl acetate copolymer, ethylene-propylene terpolymer, ethylene-propylene copolymer, vinyl chloride-ethylene copolymer, vinyl chloride-propylene copolymer and polyurethane.

12. The process of claim 1 wherein the compound of said formula is used in a mixture based on natural or synthetic rubber in an amount of from 0.5 to 30 percent by weight based on said azodicarbonamide.

13. The process of claim 1 wherein the compound of said formula is used in a mixture based on a synthetic resin in an amount of from 0.1 to 5 parts by weight based on 1 part by weight of said azodicarbonamide.

14. A mixture comprising at least one member of the group consisting of natural rubber, synthetic rubber and synthetic resins, a blowing agent amount of azodicarbonamide and as an activator for the blowing agent, an activating amount of a compound of the formula of claim 1.

15. A mixture comprising at least one member of the group consisting of natural rubber, synthetic rubber and synthetic resins, a blowing agent amount of azodicarbonamide and as an activator for the blowing agent, an activating amount of a compound of the formula of claim 1 in which the metal cation M is an element of the first Main Group, the second Main or sub-Group or the fourth sub-Group of the Periodic System or a heavy metal or M is a group of the formula wherein $R_6$ and $R_7$ are, independently of each other, hydrogen or an aliphatic radical, $R_6$ and $R_7$ together with the ammonium nitrogen form a 5, 6 or 7-membered ring system which in the case of the 6-membered ring may in addition contain a hetero atom optionally substituted by alkyl having 1 to 4 carbon atoms or a sulphur atom and $R_8$ is hydrogen or an aliphatic radical.

16. A mixture comprising at least one member of the group consisting of natural rubber, synthetic rubber and synthetic resins, a blowing agent amount of azodicarbonamide and as an activator for the blowing agent, an activating amount of sodium benzene sulphinate.

17. A mixture comprising at least one member of the group consisting of natural rubber, synthetic rubber and synthetic resins, a blowing agent amount of azodicarbonamide and as an activator for the blowing agent, an activating amount of zinc di-(benzene sulphinate).

18. A mixture comprising at least one member of the group consisting of natural rubber, synthetic rubber and synthetic resins, a blowing agent amount of azodicarbonamide and as an activator for the blowing agent, an activating amount of sodium p-chlorobenzenesulphinate.

19. A mixture comprising at least one member of the group consisting of natural rubber, synthetic rubber and synthetic resins, a blowing agent amount of azodicarbonamide and as an activator for the blowing agent, an activating amount of zinc di-(p-chlorobenzene sulphinate).

20. A mixture comprising at least one member of the group consisting of natural rubber, synthetic rubber and synthetic resins, a blowing agent amount of azodicarbonamide and as an activator for the blowing agent, an activating amount of zinc di-(p-toluene sulphinate).

* * * * *